United States Patent
Borgaonkar et al.

(10) Patent No.: US 8,223,173 B2
(45) Date of Patent: Jul. 17, 2012

(54) ELECTRONIC DEVICE HAVING IMPROVED USER INTERFACE

(75) Inventors: Shekhar Ramachandra Borgaonkar, Karnataka (IN); Prashanth Anant, Karnataka (IN); Praphul Chandra, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 12/409,526

(22) Filed: Mar. 24, 2009

(65) Prior Publication Data
US 2009/0256864 A1    Oct. 15, 2009

(30) Foreign Application Priority Data
Apr. 9, 2008   (IN) .............................. 891/CHE/2008

(51) Int. Cl.
*G09G 5/00* (2006.01)
(52) U.S. Cl. ......................................... 345/661; 345/1.1
(58) Field of Classification Search .................. 345/660, 345/661, 1.1–1.3
See application file for complete search history.

(56) References Cited

U.S. PATENT DOCUMENTS

| 6,999,068 B2* | 2/2006 | Sobol ............................. 345/418 |
| 7,742,012 B2* | 6/2010 | Yuan et al. ....................... 345/1.3 |
| 2005/0083642 A1* | 4/2005 | Senpuku et al. ............... 361/681 |
| 2006/0050090 A1* | 3/2006 | Ahmed et al. ................ 345/660 |

* cited by examiner

*Primary Examiner* — Ryan R Yang

(57) ABSTRACT

Embodiments of the present invention provide an electronic device, comprising a first display and a second display arranged to display a region of the first display at an increased magnification.

20 Claims, 4 Drawing Sheets

ELECTRONIC DEVICE HAVING IMPROVED USER INTERFACE

CROSS-REFERENCE TO RELATED APPLICATION

This application claims priority to Indian Patent Application No. 891/CHE/2008, entitled "Electronic Device Having Improved User Interface", filed on Apr. 9, 2008, which is hereby incorporated by reference in its entirety.

BACKGROUND TO THE INVENTION

Frequently, users of electronic devices, such as laptop computers, wish to view displayed content at a higher magnification. For example, a user may wish to view a desired region of a displayed document at a higher magnification. In order to allow this, a function whereby a user may "zoom" in to, or view at an increased magnification level, the desired region of the displayed content may be used. However, when viewing the desired region at the increased magnification level, a context of the region within the entire content is difficult to ascertain or may be lost.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Embodiments of the present invention utilize two display devices. One of the display devices is arranged to display, at a greater magnification, a region displayed upon the other display device. In embodiments of the invention, a user can move or navigate the region of content displayed at the greater magnification by the application and movement of touch applied to the display device arranged to display content at an increased magnification. In embodiments of the invention, a user can edit content displayed in both display devices using the display device arranged to display the region at the greater magnification.

Figure 1:
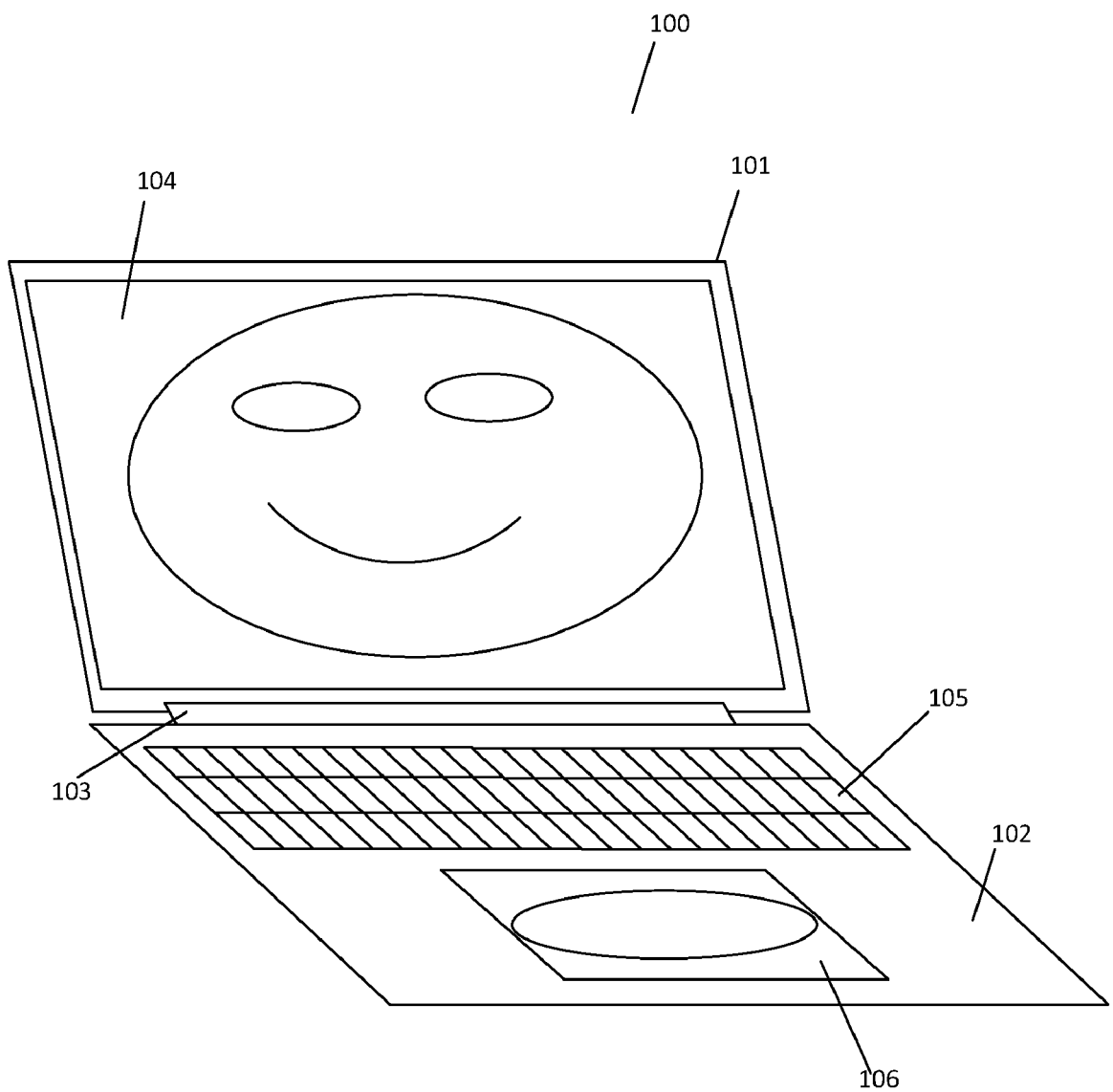
FIG. 1 is a perspective view of an embodiment of the invention.

Referring to FIG. 1, a laptop computer 100 is shown representing an embodiment of the invention. The laptop computer 100 comprises first and second generally planar portions 101, 102 connected by a hinge 103. The first portion 101 of the laptop computer comprises a first display 104 which occupies a majority of one side of the first portion 101. The first portion 101 of the laptop computer 100 is intended to be arranged in use inclined with respect to the second portion 102. The second portion 102 of the laptop computer 100 is intended to be arranged in use generally horizontally and comprises a keyboard 105 in an upper region thereof. The laptop computer 100 is closeable by rotating the first and second portions 101, 102 about the hinge 103 such that the two portions 101, 102 are coextensive and the surfaces of the first and second portions 101, 102 bearing the first display 104 and keyboard 105 are inwardly facing. A second display 106 is arranged in a lower region of the inwardly facing surface of the second portion 102 below the keyboard 105.

The first display 104 is arranged to display content, such as an operating system desktop, a document, a web page, an image etc. Meanwhile, the second display 106 is arranged to display a region of the first display 104 at a greater magnification. That is, the second display 106 displays a zoomed-in portion of the content shown upon the first display 104. Thus, embodiments of the present invention allow a user to more conveniently view content displayed by an electronic device, thereby improving a user interface of the device.

Figure 2:
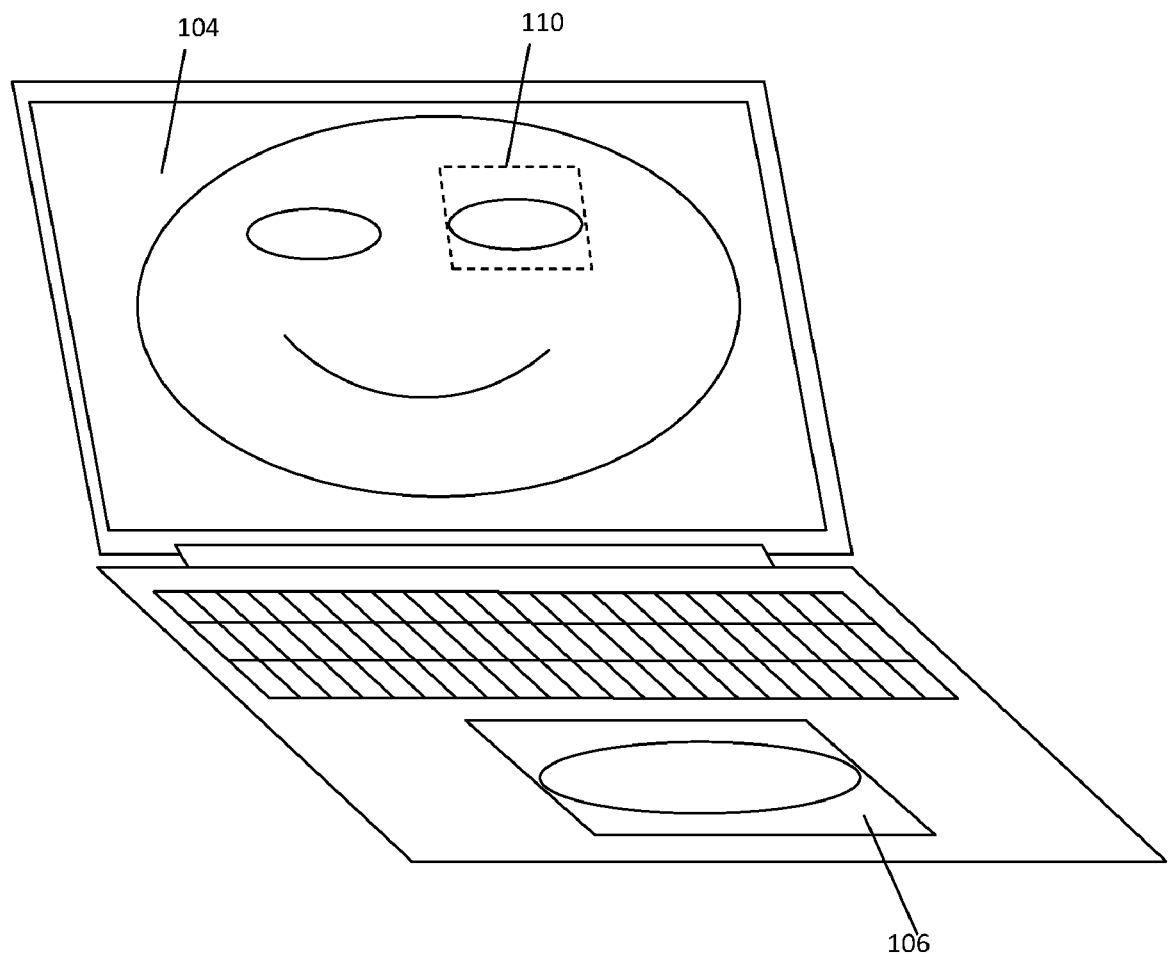
FIG. 2 is a perspective view of an embodiment of the invention.

In an embodiment of the invention, as shown in FIG. 2, a graphical region-indicator 110 is shown on the first display device 104 to indicate an area of content shown in magnified form upon the second display 106. This allows a user to easily identify the area of content displayed in magnified form upon the second display 106. The region-indicator 110 is arranged, in embodiments of the invention, around a cursor displayed upon the first display 104. An extent of the region-indicator 110 around the cursor may be determined by the user, thus effectively altering a magnification level of the second display 106. As the cursor is moved about the displayed content shown in the first display 104, the region-indicator 110 is arranged to accompany or follow movement of the cursor and the magnified region of the content displayed upon the second display 106 correspondingly moves about the content shown in the first display 104.

Figure 3:
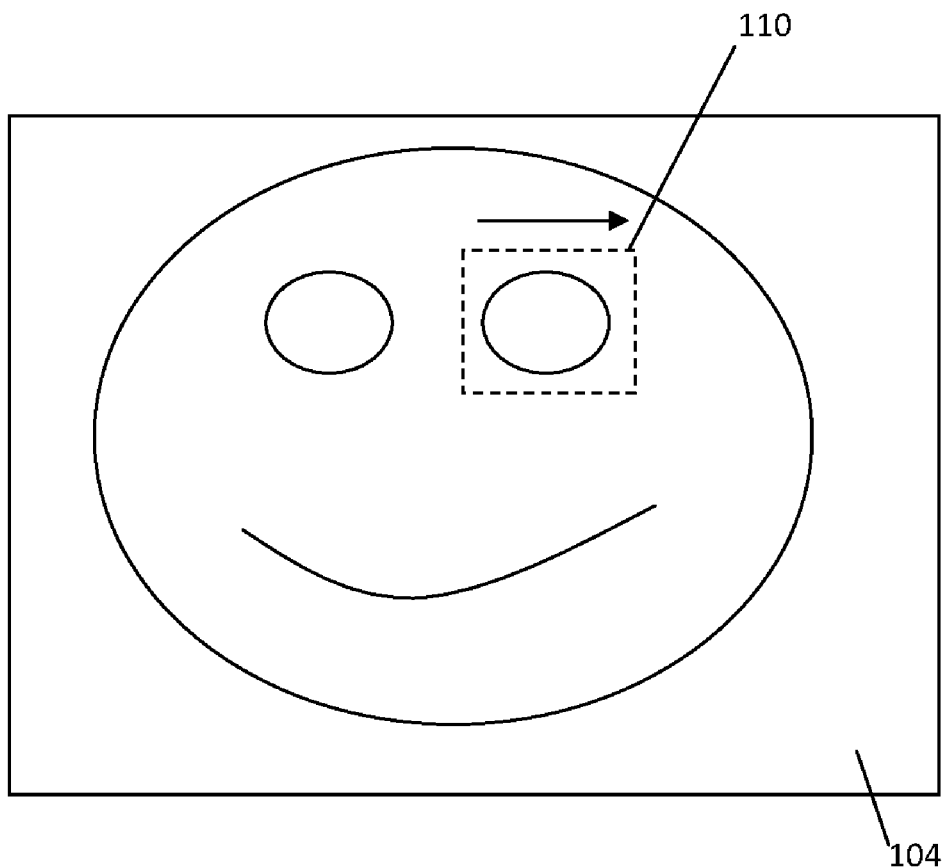
FIG. 3 shows movement of a graphical region-indicator according to an embodiment of the invention.
Figure 3:
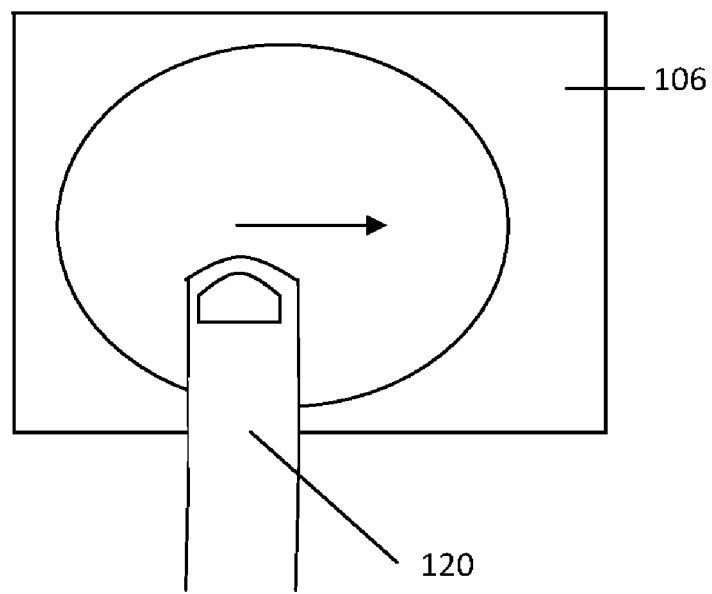

As shown in FIG. 3, in an embodiment of the invention, the magnified region displayed upon the second display 106 is moved about the first display 104 by interaction of the user with the second display 106. In this embodiment, the second display 106 comprises a touch-sensitive surface or layer arranged to detect a touch made by a user's finger 120, stylus or the like. The touch sensitive surface may operate by detecting pressure or heat applied to the second display 106. A user may navigate or move the magnified region displayed upon the second display 106 about the first display 104 by touching the second display device 106 and dragging across the surface of the second display device 106 in a direction of movement, as shown. The region-indicator 110 shown in the first display 104 and magnified region shown upon the second display 106 move in a corresponding manner to the direction of movement applied to the second display 106.

Figure 4:
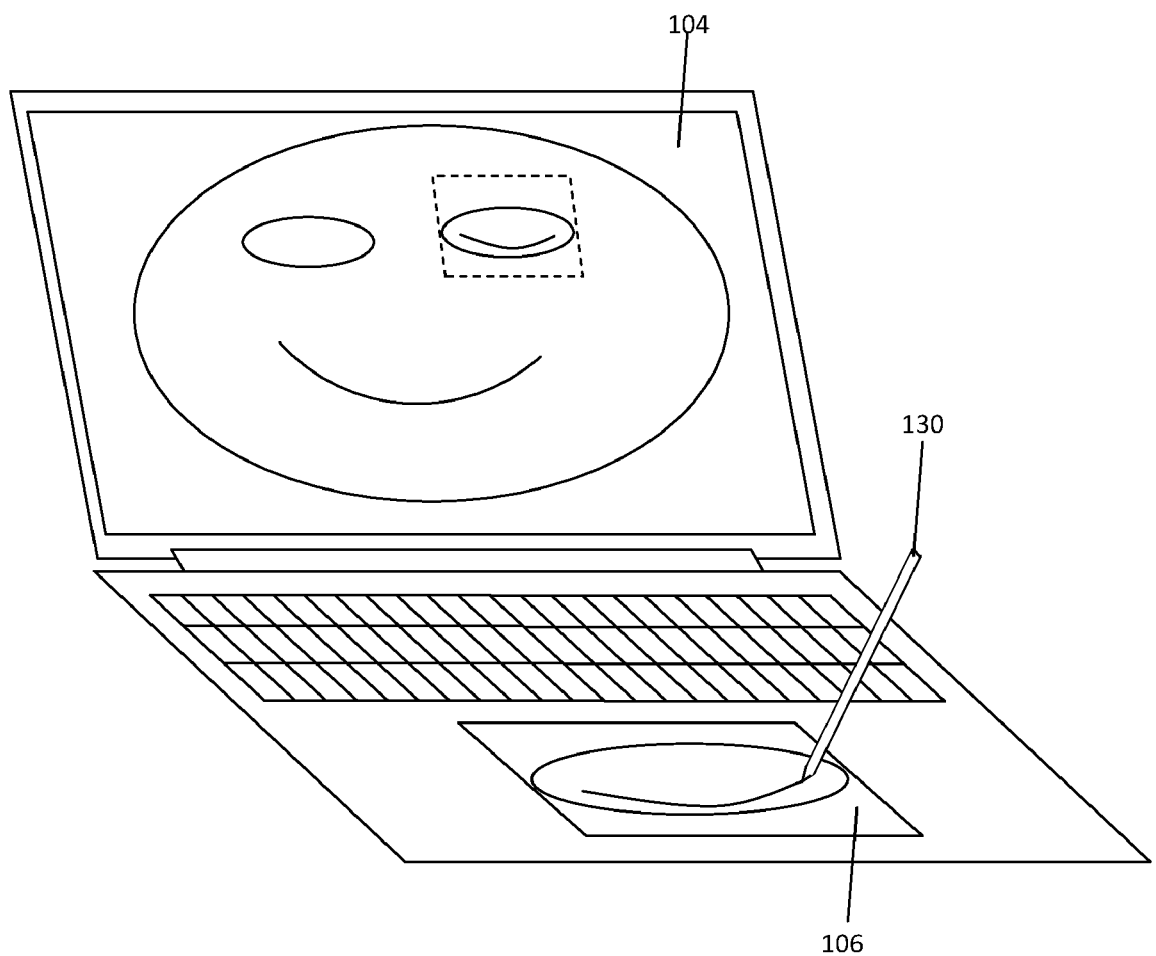
FIG. 4 is a perspective view of an embodiment of the invention.

Referring to FIG. 4, in an embodiment of the invention, the user is able to interact with the content displayed in the first display 104 via the second display 106. For example, a user is able to write, edit, amend, annotate or draw content using the second display 106. In the case that the content is a document, a user may write or annotate upon the second display 106 using a stylus 130. The writing or annotations made to the magnified region of content shown in the second display 106 are also made to the content shown in the first display 104. Alternatively, if the content is an image, then the user may edit the image using the second display 106 whilst the editing is also reflected in the image shown in the first display 104.

In an embodiment of the invention, changes or additions to the content made using the second display 106 are stored as part of the content shown in the first display 104. That is, changes are made to the one or more files stored on a storage medium in which the content is stored. However, in alternative embodiments, changes or additions to the content made using the second display 106 are stored in one or more separate files, or in a database record associated with the one or more files storing the content.

Whilst embodiments of the present invention have been shown as a laptop or portable computer, it will be realized that other embodiments of the invention may take alternate forms. Embodiments of the invention may be other portable electronic devices, such as mobile computing devices, mobile telephones, Personal Digital Assistants (PDAs), and the like.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An electronic device, comprising:
a first display; and
a second display to display a region of the first display at an increased magnification;
wherein the second display is touch sensitive such that touch applied to the second display interacts with displayed content on the second display, wherein the interaction with the displayed content on the second display includes editing of displayed content on the second display, and the content displayed on the second display and content displayed in the region of the first display are modified according to the editing of the displayed content on the second display.

2. The device as claimed in claim 1, wherein the first display is to display a graphical indication of the region displayed upon the second display.

3. The device as claimed in claim 1, wherein the region of the first display displayed upon the second display is moveable about the first display by touch applied to the second display.

4. The device as claimed in claim 1, wherein an area of the region displayed upon the second display is configurable by a user.

5. The device as claimed in claim 1, wherein the region displayed upon the second display is arranged to move about the first display following a cursor.

6. The device as claimed in claim 1, wherein the interaction with the content includes annotation of the content.

7. The device as claimed in claim 1, wherein the device includes a storage medium to store the interaction with the displayed content on the second display as part of the content.

8. The device as claimed in claim 1, wherein the device includes a storage medium to store the interaction with the displayed content on the second display in one or more files separate from the content.

9. An apparatus comprising:
first and second display devices to display content at first and second respective magnification levels, wherein the second magnification level applied to the second display device is greater than the first magnification level applied to the first display device, and
wherein the second display device is touch sensitive such that touch applied to the second display device interacts with displayed content on the second display device, wherein the interaction with the displayed content on the second display device includes editing of displayed content on the second display device, and the content displayed on the second display device and content displayed in a region of the first display device are modified according to the editing of the displayed content on the second display device.

10. The apparatus as claimed in claim 9, wherein the user input is applied to the content displayed on both first and second display devices.

11. The apparatus as claimed in claim 9, wherein the first display is to display an indication of a region of the content displayed upon the second display device.

12. The apparatus as claimed in claim 9, comprising a pressure sensor to detect pressure applied to the second display device, wherein a region of content displayed upon the second display device is moveable about the content displayed upon the first display device corresponding to a direction of movement applied to the second display device.

13. A method of displaying content, comprising:
displaying content upon a first display;
displaying a region of the content displayed upon the first display on a touch sensitive second display at a greater magnification level than upon the first display; and
receiving a user's input applied to the second display and modifying the content displayed upon the first and second displays according the input.

14. The method of claim 13, comprising indicating upon the first display the selected region of the content displayed upon the second display.

15. The method of claim 13, comprising receiving a user's input applied to the second display and moving the region displayed upon the second display about the content displayed in the first display according to the input.

16. The method of claim 15, wherein the user's input is a touch applied to the second display and the moving is performed according to a direction of movement of the touch.

17. The method of claim 13, comprising configuring an area of the region.

18. The method of claim 13, comprising storing the modification as part of the content.

19. The method of claim 13, comprising storing the modifications in a database record associated with the content.

20. The method of claim 13, comprising moving the selected portion about the content displayed upon the first display according to movement of a cursor.

* * * * *